E. B. KEITH.
COMBINED SAFETY VALVE AND PRESSURE GAGE.
APPLICATION FILED MAR. 31, 1913.
1,128,327.
Patented Feb. 16, 1915.
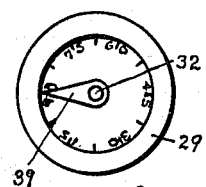
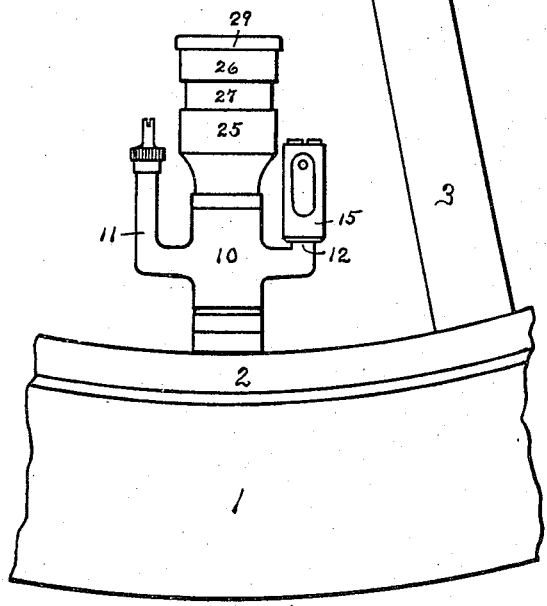
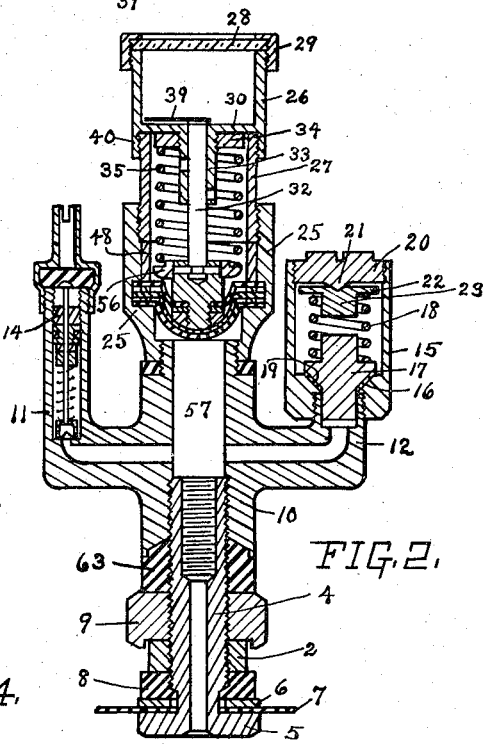
WITNESSES:
C. W. Huffman
Hugo W. Kreinbring
INVENTOR
Edward B. Keith
BY
Edward N. Pagelsen
ATTORNEY

UNITED STATES PATENT OFFICE.

EDWARD B. KEITH, OF WEST BLOOMFIELD, MICHIGAN, ASSIGNOR OF ONE-HALF TO JOHN WATCHPOCKET, OF PONTIAC, MICHIGAN.

COMBINED SAFETY-VALVE AND PRESSURE-GAGE.

1,128,327.   Specification of Letters Patent.   Patented Feb. 16, 1915.

Application filed March 31, 1913. Serial No. 757,901.

*To all whom it may concern:*

Be it known that I, EDWARD B. KEITH, a citizen of the United States, and a resident of West Bloomfield, in the county of Oakland and State of Michigan, have invented a new and Improved Combined Safety-Valve and Pressure-Gage, of which the following is a specification.

This invention relates to means for indicating the pressure in automobile tires and other containers and for limiting the maximum of such pressure, and its object is to provide a simple and efficient pressure indicating and limiting device which may be easily connected to any pneumatic tire, and which can be constructed at low cost.

This invention consists in combination with a tire valve, of a fitting on which it is mounted, of an adjustable pressure valve mounted on the fitting and provided with an auxiliary valve to permit the escape of the air or other fluid within the valve.

It further consists, in connection of a fitting connected to the tire or other container, of a cylindrical indicator casing having a flexible diaphragm and an engaging member mounted in the lower end of the casing, a revoluble stem extending upwardly from the diaphragm, a spring to resist the pressure on the diaphragm, means to cause the stem to turn as it moves longitudinally, and an indicator connected to said stem.

In the accompanying drawing, Figure 1 is an elevation of this improved device mounted on a wheel. Fig. 2 is a central section of the same parallel to the plane of Fig. 1. Fig. 3 is an elevation of a novel tire tube. Fig. 4 is a plan of the same. Figs. 5 to 7 are details of construction. Fig. 8 is a vertical central section of the diaphragm.

Similar reference characters refer to like parts throughout the several views.

The tire 1, rim 2 and spoke 3 of Fig. 1 are old and well known, as are also the tire tube 4, its head 5 and washer 6 which grip the inner tube 7, the nut 8 to hold down the washer, and the nut 9 to grip the rim. The tire tube may be shortened if desired in order to bring the combined safety valve and pressure indicator near the rim.

Screwed onto the tire tube is a fitting in the form of a cross 10, with upwardly extending arms 11 and 12. Within the arm 11 is a tire valve 14 of any desired construction which needs no further explanation. On the arm 12 is screwed a cylindrical body 15 having a tapering seat 16 for the valve 17, held to its seat by the spring 18. The valve 17 is preferably provided with a thin rubber face 19 to absolutely prevent leakage. The tension of the spring is regulated by the plug 20, which screws into the upper end of the body 15, and has a conical projection 21 that engages in a depression in the member 22 that engages the spring 18, and which has a central projection 23 to hold it central with the spring.

A pressure gage forms the upper end of the central portion of the cross 10. It consists of a diaphragm supporting sleeve 25, an upper indicator chamber 26 and a connecting sleeve 27, together with the different parts therein. The chamber 26 has a disk 28 of glass held in position by the ring 29, and its bottom 30 may be graduated as indicated in Fig. 5. Revoluble and slidable in the bottom 30 is a stem 32 having an indicator hand 39 at its upper end. A tubular extension 33 on this bottom is threaded at its upper end to receive the nut 34 by means of which the tension on the spring 35 is regulated. This tubular member 33 is also provided with a spiral slot 36 (Fig. 7) in which a pin 37 on the stem 32 is movable, which pin preferably carries an antifriction roller 38. It will therefore be seen that when this stem 32 is moved up and down, it will turn by reason of the spiral slot 36 in which the pin 37 moves, and by means of the indicator 39 and the figures on the bottom of the chamber 26, the amount of movement can be determined. The chamber 26 may have a flange 40 to screw onto the upper end of the connecting sleeve 27.

The sleeve 25 which forms the chamber for the diaphragms has a shoulder 42, as shown in Fig. 8, on which rest the layers 43, 44 and 45 of flexible material, preferably sheet rubber, properly reinforced if desired, separated by the rings 46 and 47, and held in position by the wide ring 48 which is pushed down by the sleeve 27 as shown in Fig. 2. A button 49 at the lower end of the stem 32 has a screw threaded end 50 which passes through a hole in the upper layer 43, and carries a nut 52 and washer 5" to unite it to this layer. The button has a transverse hold to receive the pins 54 which engage in a slot 55 in the stem 32, which pins are held in position by the bearing ring 56.

As the pressure in the bore of the tire tube 4 increases, and therefore increases in the chamber 57 below the diaphragm formed by the layers 43—44—45, the diaphragm and the button 49, together with the stem 32, will be pushed upward against the spring 35, and, because of the spiral slot 36 and the pin 37, the stem will turn in the tube 33 and turn the hand 39. The angular movement of this hand will be approximately in proportion to the change in pressure in the chamber 57, so that the graduations shown in Fig. 5 may be made to correctly indicate the pressure under the diaphragm. When the pressure falls, the spring 35 will force down the button 49 and the stem 32, and turn back the hand.

Many of the details of construction may be changed by those skilled in the art without departing from the spirit of my invention as set forth in the claims and many of the refinements shown may be omitted.

When the tire has been removed and it is desired to replace it, a long tire tube is desirable. I therefore prefer to counterbore the tube 4 and thread the outer end to receive the threaded end 60 of an extension 61, shown in Fig. 3, until the part 4 is properly secured in position by means of a nut 9, whereupon the part 61 can be removed and the combined valve and indicator put in position.

As the tube 4 is made flat, as a rule, in order that it can be held while the nut 8 is being screwed down, a resilient washer 63, preferably of rubber, is placed on the tube so that, when it is forced against the tube by the lower cup-shaped end of the fitting 10, a tight joint between fitting and tube will be insured. This device will be exposed to water and mud, and the discharge opening 64 in the body 15 of the valve is therefore liable to become plugged. To prevent this, a small leaf-spring 65 (Fig. 6) may be secured to the valve-body by means of a rivet 66, and carry a small bit of rubber 67 to cover the hole. The construction shown in Fig. 6 is greatly exaggerated in size.

The advantage of this safety valve lies in the fact that the dangerous increase in pressure in the tire because of the heating of the air in the tire is entirely prevented.

I claim.

1. In a pressure indicator, the combination of a support, a pressure indicator mounted on the support and comprising a sleeve and a diaphragm mounted in said sleeve formed of a plurality of flexible sheets, a button operated by said sheets, a stem revolubly connected to said button, a spring to resist the upward movement of said button, and means for turning said stem as it is moved upward against the pressure of said spring.

2. In a pressure indicator, the combination of a diaphragm chamber consisting of a cylindrical tube having an internal shoulder, a flexible diaphragm resting on said shoulder, means to hold the diaphragm in position, a button connected to said diaphragm, a stem mounted on said button and movable longitudinally therewith but revoluble independent thereof, a pin mounted on said stem, a tube wherein said stem is slidable provided with a spiral slot through which said pin on said stem extends whereby said stem is turned as it is moved longitudinally in said tube, an indicating hand at the upper end of the stem, and a chamber at the upper end of said tube wherein said indicating hand is mounted.

3. In a pressure indicator, the combination of a support, a pressure indicator mounted on the support and comprising a sleeve and a diaphragm mounted in said sleeve, a button operated by said diaphragm, a stem connected to said button, a spring engaging the button to resist the upward movement of said button, means for turning said stem as it is moved upward against the pressure of said spring, and means to adjust the tension of the spring.

In testimony whereof I have signed this specification in the presence of two subscribing witnesses.

EDWARD B. KEITH.

Witnesses:
JOHN WATCHPOCKET,
JAMES H. KEITH.